(12) United States Patent
Gan

(10) Patent No.: US 9,952,708 B2
(45) Date of Patent: Apr. 24, 2018

(54) ELECTRONIC DEVICE AND CONTROL METHOD FOR THE SAME

(71) Applicant: Lenovo (Beijing) Co., Ltd., Beijing (CN)

(72) Inventor: Dayong Gan, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/753,803

(22) Filed: Jun. 29, 2015

(65) Prior Publication Data

US 2016/0212256 A1 Jul. 21, 2016

(30) Foreign Application Priority Data

Jan. 21, 2015 (CN) .......................... 2015 1 0030084

(51) Int. Cl.
*H04M 1/725* (2006.01)
*G06F 3/041* (2006.01)
*H04W 52/02* (2009.01)
*G09G 3/00* (2006.01)
*H04N 5/225* (2006.01)
(Continued)

(52) U.S. Cl.
CPC .......... *G06F 3/0416* (2013.01); *G06F 1/1616* (2013.01); *G06F 1/1626* (2013.01); *G06F 1/1637* (2013.01); *G06F 1/1686* (2013.01); *G06F 1/3265* (2013.01); *G09G 3/001* (2013.01); *H04M 1/72569* (2013.01); *H04N 5/2257* (2013.01); *H04W 52/0254* (2013.01); *G09G 2300/0456* (2013.01); *H04M 1/0266* (2013.01);
(Continued)

(58) Field of Classification Search
CPC ................................................ H04M 1/72563
See application file for complete search history.

(56) References Cited

U.S. PATENT DOCUMENTS

| | | | | |
|---|---|---|---|---|
| 961,851 A | * | 6/1910 | Sorensson | A63F 7/0608 |
| | | | | 273/317.7 |
| 2004/0155861 A1 | * | 8/2004 | Jackson, III | G06F 1/1632 |
| | | | | 345/156 |

(Continued)

FOREIGN PATENT DOCUMENTS

| | | |
|---|---|---|
| CN | 201674538 U | 12/2010 |
| CN | 102881229 A | 1/2013 |

(Continued)

OTHER PUBLICATIONS

First German Office Action regarding Application No. 102015211784.7 dated Feb. 3, 2016. English translation provided by Unitalen Attorneys at Law.

(Continued)

*Primary Examiner* — Mazda Sabouri
(74) *Attorney, Agent, or Firm* — Harness, Dickey & Pierce, P.L.C.

(57) ABSTRACT

An electronic device includes a transparent display, a display controller; configured to control the transparent display to display content; a first adjustable optical panel, arranged on a first surface of the transparent display; and an adjustable optical panel controller, configured to control states of the first adjustable optical panel, wherein the first adjustable optical panel is transparent in a first state and the first adjustable optical panel is non-transparent in a second state.

2 Claims, 7 Drawing Sheets

(51) Int. Cl.
*G06F 1/16* (2006.01)
*G06F 1/32* (2006.01)
*H04M 1/02* (2006.01)
*H04M 1/22* (2006.01)

(52) U.S. Cl.
CPC .............. *H04M 1/22* (2013.01); *Y02D 70/00* (2018.01); *Y02D 70/26* (2018.01)

(56) References Cited

U.S. PATENT DOCUMENTS

| | | | |
|---|---|---|---|
| 2004/0227724 A1* | 11/2004 | Chang | G06F 1/1677 345/156 |
| 2005/0206808 A1 | 9/2005 | Hyytiainen | |
| 2009/0231244 A1* | 9/2009 | Lee | G06F 1/1624 345/76 |
| 2009/0231662 A1* | 9/2009 | Sorensson | G02F 1/15 359/273 |
| 2011/0124376 A1* | 5/2011 | Kim | G06F 1/1626 455/566 |
| 2012/0105306 A1* | 5/2012 | Fleck | G06F 1/1643 345/1.1 |
| 2012/0105428 A1* | 5/2012 | Fleck | G06F 3/1431 345/419 |
| 2012/0105487 A1 | 5/2012 | Son et al. | |
| 2013/0109438 A1* | 5/2013 | Kwack | H04M 1/0214 455/566 |
| 2014/0146248 A1 | 5/2014 | Wang et al. | |
| 2014/0232704 A1* | 8/2014 | Kim | G09G 3/20 345/204 |
| 2014/0380227 A1 | 12/2014 | Ng et al. | |
| 2015/0024728 A1* | 1/2015 | Jang | H04M 1/72519 455/418 |
| 2015/0254044 A1* | 9/2015 | Cho | G06F 3/1423 455/566 |

FOREIGN PATENT DOCUMENTS

| | | |
|---|---|---|
| CN | 103676257 A | 3/2014 |
| WO | WO-2014110567 A2 | 7/2014 |

OTHER PUBLICATIONS

First Chinese Office Action regarding Application No. 201510030084.8 dated Mar. 27, 2017. English translation provided by Unitalen Attorneys at Law.

* cited by examiner

ELECTRONIC DEVICE AND CONTROL METHOD FOR THE SAME

This application claims priority to Chinese Patent Application No. 201510030084.8, entitled "ELECTRONIC DEVICE AND CONTROL METHOD FOR THE SAME", filed with the Chinese State Intellectual Property Office on Jan. 21, 2015, which is incorporated by reference in its entirety herein.

FIELD

The disclosure generally relates to the technical field of electronic apparatus, and in particular to an electronic device and a control method for the same.

BACKGROUND

With development of science and technology, a variety of display devices have been gradually applied in people's daily life and work, and have provided great convenience for people's daily life and work.

A transparent display device is a new display device by which image may be displayed and through which the environment behind the transparent display device can be seen.

However, since the conventional transparent display device is transparent, contrast of the image displayed on the conventional transparent display device may be greatly affected by the environment behind the transparent display device. The conventional transparent display device is provided with only a transparent display mode, and a light transmission state is not adjustable.

SUMMARY

In view of this, it is provided an electronic device and a control method for the same according to the disclosure. A light transmission state of the electronic device is adjustable.

It is provided an electronic device according to the disclosure, the electronic device includes:

a transparent display;

a display controller, configured to control the transparent display to display content;

a first adjustable optical panel arranged on a first surface of the transparent display; and an adjustable optical panel controller, configured to control states of the first adjustable optical panel, where the first adjustable optical panel is transparent in a first state, and the first adjustable optical panel is non-transparent in a second state.

Optionally, the above electronic device may further include:

a second adjustable optical panel arranged on a second surface of the transparent display, where the first surface and the second surface are two opposite surfaces of the transparent display;

where the adjustable optical panel controller may be further configured to control states of the second adjustable optical panel, where the second adjustable optical panel is transparent in a first state, and the second adjustable optical panel is non-transparent in a second state.

Optionally, the above electronic device may be a multi-mode electronic device including a first body and a second body rotatable with respect to the first body; where the first body of the multi-mode electronic device includes the transparent display, the first adjustable optical panel and the second adjustable optical panel; and the adjustable optical panel controller may be further configured to: control the first adjustable optical panel to be in the second state and control the second adjustable optical panel to be in the first state, in the case that the adjustable optical panel controller obtains a first control instruction; where the first control instruction indicates that the multi-mode electronic device is in a laptop mode; or control the first adjustable optical panel to be in the first state and control the second adjustable optical panel to be in the second state, in the case that the adjustable optical panel controller obtains a second control instruction, where the second control instruction indicates that the multi-mode electronic device is in a tablet mode; or control the first adjustable optical panel to be in the first state and control the second adjustable optical panel to be in the first state, in the case that the adjustable optical panel controller obtains a third control instruction, where the third control instruction indicates that the multi-mode electronic device is in an stand mode; or control the first adjustable optical panel to be in the second state and control the second adjustable optical panel to be in the second state in the case that the adjustable optical panel controller obtains a fourth control instruction, where the fourth control instruction indicates that the multi-mode electronic device is in a tent mode.

Optionally, the above electronic device may be a smart phone including a first body and a second body; the first body includes the transparent display, the first adjustable optical panel and the second adjustable optical panel, and the second body includes a non-transparent region arranged at an end of the first body; and the adjustable optical panel controller may be further configured to control the states of the first adjustable optical panel and the states of the second adjustable optical panel based on a predetermined operating mode.

Optionally, in the above electronic device, the smart phone may has a sleep mode and a running mode, the adjustable optical panel controller may control the first adjustable optical panel to be in the second state and controls the second adjustable optical panel to be in the second state, in the case that the smart phone is in the sleep mode; or the adjustable optical panel controller may control at least one of the first adjustable optical panel and the second adjustable optical panel to be in the first state, in the case that the smart phone is in the running mode.

Optionally, in the above electronic device, in the case that the smart phone is in the running mode, the adjustable optical panel controller may be configured to: determine one of the first adjustable optical panel and the second adjustable optical panel as a surface being viewed for a user; and control an adjustable optical panel corresponding to the surface being viewed to be in the first state and control the other adjustable optical panel to be in the second state.

Preferably, in the above electronic device, a gravity sensor may be arranged in the non-transparent region, the adjustable optical panel controller may determine the surface being viewed based on a gravity detection signal of the gravity sensor; or a first camera may be arranged on a surface of the non-transparent region facing in a same direction with the first surface and a second camera may be arranged on a surface of the non-transparent region facing in a same direction with the second surface, the adjustable optical panel controller may determine the surface being viewed based on image capture results of the first camera and the second camera.

Preferably, in the above electronic device, in the case that the smart phone is in the running mode and a preset application is run at the smart phone, the adjustable optical panel controller may control both the first adjustable optical panel and the second adjustable optical panel to be in the first state.

Preferably, the above electronic device may be a wearable electronic device including a display screen and a wear part; where the display screen of the wearable electronic device may include the transparent display, the first adjustable optical panel and the second adjustable optical panel.

Preferably, in the above electronic device, a structure of the first adjustable optical panel may be the same as a structure of the second adjustable optical panel; where the first adjustable optical panel may include:

a first transparent electrode layer and a second transparent electrode layer arranged oppositely; and a liquid crystal layer arranged between the first transparent electrode layer and the second transparent electrode layer, where the adjustable optical panel controller may control the first adjustable optical panel to be in a light transmission state or a non-light transmission state by controlling an electric field between the first transparent electrode layer and the second transparent electrode layer.

It is also provided according to the disclosure a control method for controlling the above electronic device, the control method includes:

controlling the first adjustable optical panel to be in the first state in which the first adjustable optical panel is transparent, in the case that the electronic device is in a first display condition; or controlling the first adjustable optical panel to be in the second state in which the first adjustable optical panel is non-transparent, in the case that the electronic device is in a second display condition.

Preferably, in the above control method, the electronic device may further include a second adjustable optical panel arranged on a second surface of the transparent display; and the control method may further include:

controlling the second adjustable optical panel to be in a first state in which the second adjustable optical panel is transparent, in the case that the electronic device is in a third display condition; or controlling the second adjustable optical panel to be in a second state in which the second adjustable optical panel is non-transparent, in the case that the electronic device is in a fourth display condition.

Preferably, in the above control method, the electronic device may be a multi-mode electronic device including a first body and a second body rotatable with respect to the first body; and the first body of the multi-mode electronic device includes the transparent display, the first adjustable optical panel and the second adjustable optical panel; and the control method may further include:

controlling the first adjustable optical panel to be in the second state and controlling the second adjustable optical panel to be in the first state based on a first control instruction in the case that the first control instruction is obtained, where the first control instruction indicates that the multi-mode electronic device is in a laptop mode; or controlling the first adjustable optical panel to be in the first state and controlling the second adjustable optical panel to be in the second state based on a second control instruction in the case that the second control instruction is obtained, where the second control instruction indicates that the multi-mode electronic device is in a tablet mode; or controlling the first adjustable optical panel to be in the first state and controlling the second adjustable optical panel to be in the first state based on a third control instruction in the case that the third control instruction is obtained, where the third control instruction indicates that the multi-mode electronic device is in a stand mode; or controlling the first adjustable optical panel to be in the second state and controlling the second adjustable optical panel to be in the second state based on a fourth control instruction in the case that the fourth control instruction is obtained, where the fourth control instruction indicates that the multi-mode electronic device is in a tent mode.

Preferably, in the above control method, the electronic device may be a smart phone including a display screen and a non-transparent region arranged at an end of the display screen; and the display screen includes the transparent display, the first adjustable optical panel and the second adjustable optical panel;

the control method may further include: controlling the state of the first adjustable optical panel and the state of the second adjustable optical panel based on a predetermined operating mode.

Preferably, the above control method may further include: controlling the first adjustable optical panel to be in the second state and controlling the second adjustable optical panel to be in the second state, in the case that the smart phone is in a sleep mode; or controlling at least one of the first adjustable optical panel and the second adjustable optical panel to be in the first state in the case that the smart phone is in a running mode.

Preferably, in the above control method, in the case that the smart phone is in the running mode, the control method may further include: determining one of the first adjustable optical panel and the second adjustable optical panel as a surface being viewed for a user; and controlling an adjustable optical panel corresponding to the surface being viewed to be in the first state and controlling the other adjustable optical panel to be in the second state.

Preferably, in the above control method, the determining one of the first adjustable optical panel and the second adjustable optical panel as a surface being viewed for a user may include:

determining a surface being viewed based on a gravity detection signal of a gravity sensor arranged in the non-transparent region; or determining a surface being viewed based on touch sense results of a first touch sensor arranged on a surface of the non-transparent region facing in a same direction with the first surface and a second touch sensor arranged on a surface of the non-transparent region facing in a same direction with the second surface, or determining a surface being viewed based on image capture results of a first camera arranged on a surface of the non-transparent region facing in a same direction with the first surface and a second camera arranged on a surface of the non-transparent region facing in a same direction with the second surface.

Preferably, in the above control method, in the case that the smart phone is in the running mode and a preset application is run at the smart phone, the control method may further include: controlling both the first adjustable optical panel and the second adjustable optical panel to be in the first state.

According to the above description, the electronic device according to the disclosure includes a transparent display configured to perform display; a display controller configured to control the transparent display to perform the display based on content to be displayed; a first adjustable optical panel arranged on a first surface of the transparent display; and an adjustable optical panel controller configured to control states of the first adjustable optical panel, where the first adjustable optical panel is transparent in a first state and is non-transparent in a second state. The electronic device switches the first adjustable optical panel between being transparent and being non-transparent by controlling the light transmission state of the first adjustable optical panel. A transparent display can be performed in the case that the first adjustable optical panel is in the first state. Or a non-transparent display can be performed in the case that the first adjustable optical panel is in the second state, where display is performed through a second surface opposite to the first surface. In this way, the light transmission state of the electronic device is adjustable. The control method according to the disclosure may used to control the light transmission state of the electronic device.

BRIEF DESCRIPTION OF THE DRAWINGS

For clarity of technical solutions of embodiments of the present applicant or prior art, drawings for the embodiments or the prior art will be briefly described below. Apparently, the drawings referred in the following description are merely a few embodiments of the disclosure. Those skilled in the art may obtain some other drawings from these drawings, without paying any creative work.

DETAILED DESCRIPTION

The technical solution according to the embodiments of the present disclosure is described clearly and completely as follows in conjunction with the drawings. It is obvious that the described embodiments are merely a few embodiments according to the present disclosure. Any other embodiment obtained by those skilled in the art based on the embodiments in the present disclosure without paying any creative work falls in the scope of the present disclosure.

It is provided an electronic device according to an embodiment of the disclosure. The electronic device includes: a transparent display configured to perform display; a display controller configured to control the transparent display to perform the display based on content to be displayed; a first adjustable optical panel arranged on a first surface of the transparent display; and an adjustable optical panel controller configured to control states of the first adjustable optical panel, where the first adjustable optical panel is transparent in a first state and is non-transparent in a second state.

As can be seen, the electronic device switches the first adjustable optical panel between being transparent and being non-transparent by controlling the state of the first adjustable optical panel, to either perform a transparent display in the case that the first adjustable optical panel is in the first state or perform a non-transparent display in the case that the first adjustable optical panel is in the second state, i.e., the display is performed through a second surface opposite to the first surface. In this way, to a high contrast and a good display effect are obtained in the electronic device.

In order to make the technical solution according to the disclosure more clear, the above technical solution is described below in detail in conjunction with the drawings.

Figure 1:
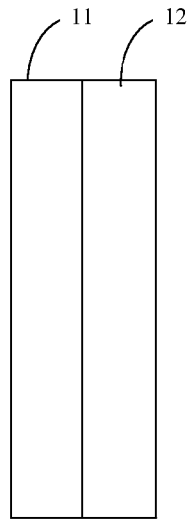
FIG. 1 is a schematic structural diagram of an electronic device according to an embodiment of the disclosure.

Reference is made to FIG. 1, which is a schematic structural diagram of an electronic device according to an embodiment of the disclosure. The electronic device includes a transparent display 11, a display controller, a first adjustable optical panel 12 and an adjustable optical panel controller. The first adjustable optical panel 12 is arranged on a first surface of the transparent display 11.

The display controller and the adjustable optical panel controller are not shown in FIG. 1, which may be arranged at various positions depending on particular electronic products. For example, in the case that the electronic device is a mobile phone or a tablet computer, a non-transparent region may be arranged on an upper end or a lower end of a display screen of the electronic device, and the display controller and the adjustable optical panel controller are arranged in the non-transparent region. And in the case that the electronic device is a laptop, the display controller and the adjustable optical panel controller may be arranged in a body of the laptop where input keys are also disposed.

In the electronic device shown in FIG. 1, in the case that the first adjustable optical panel 12 is controlled to be in a first state, the first adjustable optical panel 12 is transparent, the electronic device may perform display through the first surface or a second surface opposite to the first surface, and a user may view a scene through the electronic device. In the case that the first adjustable optical panel 12 is controlled to be in a second state, the first adjustable optical panel 12 is non-transparent, the electronic device may perform display through a second surface opposite to the first surface. In this case, since the first adjustable optical panel 12 is non-transparent, compared with a double-sided display, performing the display through the second surface leads to a higher contrast and a better display effect.

Figure 2:
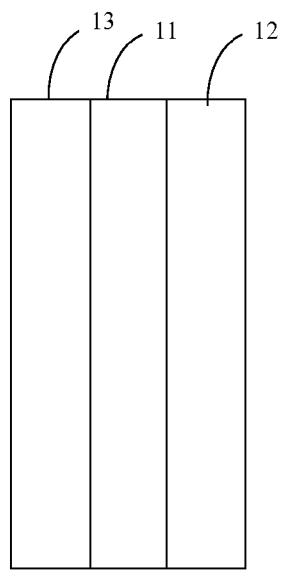
FIG. 2 is a schematic structural diagram of another electronic device according to an embodiment of the disclosure.

Reference is made to FIG. 2, which is a schematic structural diagram of another electronic device according to an embodiment of the disclosure. Besides the components shown in FIG. 1, the electronic device shown in FIG. 2 further includes a second adjustable optical panel 13 arranged on the second surface of the transparent display 11. In the embodiment shown in FIG. 2, adjustable optical panels are arranged on two sides of the transparent display 11. In this case, the adjustable optical panel controller is further configured to control states of the second adjustable optical panel, the second adjustable optical panel is transparent in a first state and is non-transparent in a second state.

The embodiment shown in FIG. 2 includes following four states of light transmission.

The first adjustable optical panel 12 is in the first state in which the first adjustable optical panel 12 is transparent, and the second adjustable optical panel 13 is in the second state in which the second adjustable optical panel 13 is non-transparent. In this case, the electronic device can only perform display through the first surface. And in this case, since the second adjustable optical panel 13 is non-transparent, compared with the double-sided display, performing the display through the first surface leads to a higher contrast and a better display effect.

The first adjustable optical panel 12 is in the second state in which the first adjustable optical panel 12 is non-transparent, and the second adjustable optical panel 13 is in the first state in which the second adjustable optical panel 13 is transparent. In this case, the electronic device can only perform display through the second surface. And in this case, since the first adjustable optical panel 12 is non-transparent, compared with the double-sided display, performing the display through the second surface leads to a higher contrast and a better display effect.

The first adjustable optical panel 12 is in the first state in which the first adjustable optical panel 12 is transparent, and the second adjustable optical panel 13 is in the first state in which the second adjustable optical panel 13 is transparent. In this case, the electronic device can perform display through the first surface and can also perform the display through the second surface, and the user may view a scene through the electronic device.

The first adjustable optical panel 12 is in the second state in which the first adjustable optical panel 12 is non-transparent, and the second adjustable optical panel 13 is in the second state in which the second adjustable optical panel 13 is non-transparent. In this case, the electronic device is in a sleep mode, a position of the electronic device is easy to found.

The electronic device according to an embodiment may be a multi-mode electronic device.

Figure 3:
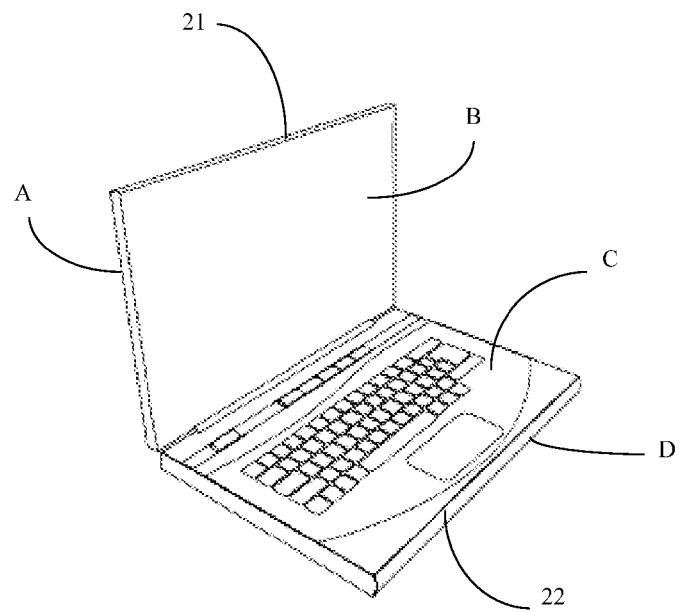
FIG. 3 is a schematic structural diagram of a multi-mode electronic device according to an embodiment of the disclosure.

Reference is made to FIG. 3, which is a schematic structural diagram of a multi-mode electronic device according to an embodiment of the disclosure. The multi-mode electronic device includes a first body 21 and a second body 22 rotatable with respect to the first body 21.

The first body 21 of the multi-mode electronic device includes the transparent display 11, the first adjustable optical panel 12 and the second adjustable optical panel 13 shown in FIG. 2. The display controller and the adjustable optical panel controller may be arranged in the second body 22. The first body 21 and the second body 22 are rotatably connected. It is considered that the angle between the first body 21 and the second body 22 is in a closed state in the case that an angle between the first body 21 and the second body 22 is about 0. It is defined that, in the case that the multi-mode electronic device is closed, an outside surface of the first body 21 is surface A, an inside surface of the first body 21 is surface B, an inside surface of the second body 22 is surface C, and a outside surface of the second body 22 is surface D.

In this embodiment, the first adjustable optical panel may be set as surface A and the second adjustable optical panel may be set as surface B. Optionally, the first adjustable optical panel may be set as surface B and the second adjustable optical panel may be set as surface A.

The adjustable optical panel controller is configured to: control the first adjustable optical panel to be in the second state and control the second adjustable optical panel to be in the first state, in the case that the adjustable optical panel controller obtains a first control instruction, where the first control instruction indicates that the multi-mode electronic device is in a laptop mode, and in this case only one of surface A and surface B is transparent.

The adjustable optical panel controller is configured to control the first adjustable optical panel to be in the first state and control the second adjustable optical panel to be in the second state, in the case that the adjustable optical panel controller obtains a second control instruction, where the second control instruction indicates that the multi-mode electronic device is in a tablet mode, and in this case only one of surface A and surface B is transparent.

The adjustable optical panel controller is configured to control the first adjustable optical panel to be in the first state and control the second adjustable optical panel to be in the first state, in the case that the adjustable optical panel controller obtains a third control instruction, where the third control instruction indicates that the multi-mode electronic device is in a stand mode, and in this case both surface A and surface B are transparent.

The adjustable optical panel controller is configured to control the first adjustable optical panel to be in the second state and control the second adjustable optical panel to be in the second state in the case that the adjustable optical panel controller obtains a fourth control instruction, where the fourth control instruction indicates that the multi-mode electronic device is in a tent mode, and in this case both surface A and surface B are non-transparent.

Figure 4:
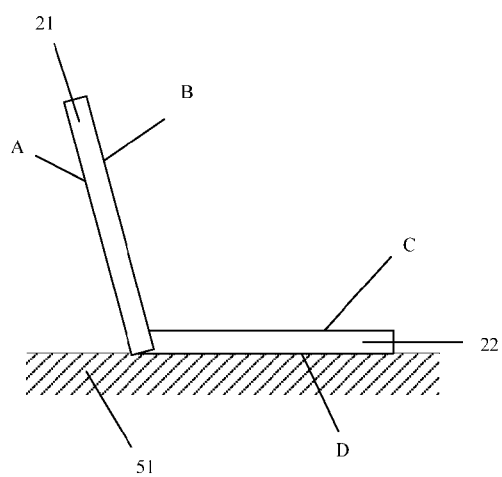
FIG. 4 is a schematic diagram of a use mode of the multi-mode electronic device according to the embodiment of the disclosure.

In the case that surface B is non-transparent and surface A is transparent, the first body 21 performs display through surface A. A use mode of the multi-mode electronic device in this case may be as shown in FIG. 4, which is a schematic diagram of a use mode of the multi-mode electronic device according to the embodiment of the disclosure. Surface D is placed on a placement table 51, and the first body 21 performs display through surface A. The angle between the first body 21 and the second body 22 is less than or equal to 135° in order to facilitate the user to watch. A double shaft structure is not necessary in this case, an operator may operate the multi-mode electronic device and present a display image to other people through surface A at the same time.

Figure 5:
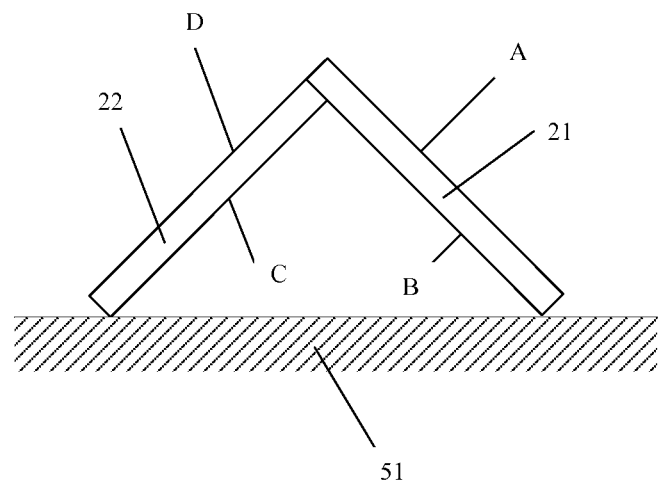
FIG. 5 is a schematic diagram of another use mode of the multi-mode electronic device according to an embodiment of the disclosure.

In the case that surface B is non-transparent and surface A is transparent, a use mode of the multi-mode electronic device may also be as shown in FIG. 5. FIG. 5 is a schematic diagram of another use mode of the multi-mode electronic device according to the embodiment of the disclosure. The first body 21 and the second body 22 stand in an inverted "V" shape on the placement surface of the table 51. The angle between the first body 21 and the second body 22 is less than 180 degree in order to facilitate the user to view. A shaft with a rotating angle of 360° is not necessary between the first body 21 and the second body 22. Stand display may be performed on the multi-mode electronic device through a shaft with a rotating angle less than 180 degree, and the stand display may be viewed by the user.

Figure 6:
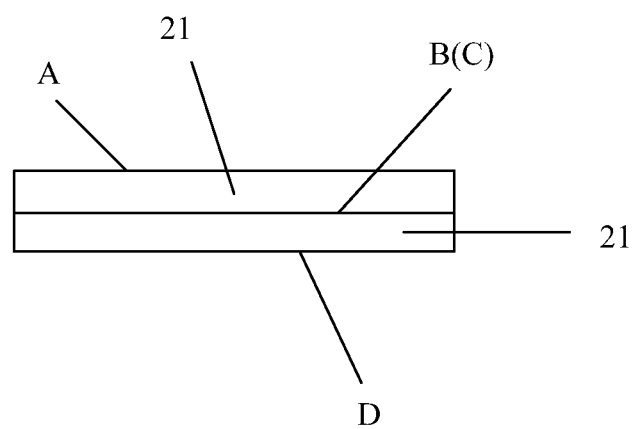
FIG. 6 is a schematic diagram of another use mode of the multi-mode electronic device according to an embodiment of the disclosure.

In the case that surface B is non-transparent and surface A is transparent, a use mode of the multi-mode electronic device may also be as shown in FIG. 6. FIG. 6 is a schematic diagram of another use mode of the multi-mode electronic device according to the embodiment of the disclosure. An angle between the first body 21 and the second body 22 in this case is 0, the multi-mode electronic device held in a hand is used in a tablet mode. Compared with a conventional multi-mode electronic device, the multi-mode electronic device in this embodiment may be in the tablet computer display mode without a shaft a the rotating angle of 360 degree.

Figure 7:
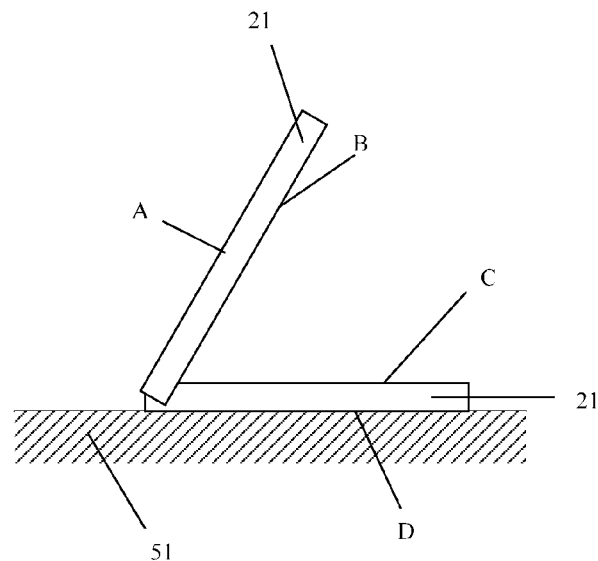
FIG. 7 is a schematic diagram of another use mode of the multi-mode electronic device according to an embodiment of the disclosure.

In the case that surface B is non-transparent and surface A is transparent, a use mode of the multi-mode electronic device may also be the use mode as shown in FIG. 7. FIG. 7 is a schematic diagram of another use mode of the multi-mode electronic device according to the embodiment of the disclosure. The angle between the first body 21 and the second body 22 in this case is larger than 0 degree and smaller than 90 degree. In this case, the multi-mode electronic device is in a stand mode.

In the case that surface B is transparent and surface A is non-transparent, the first body 21 performs display through surface B. A use mode of the multi-mode electronic device in this case may be a use mode as shown in FIG. 4 or FIG. 7. The angle between the first body 21 and the second body 22 is larger than or equal to 45 degree and smaller than or equal to 180 degree in order to facilitate the user to view.

Figure 8:
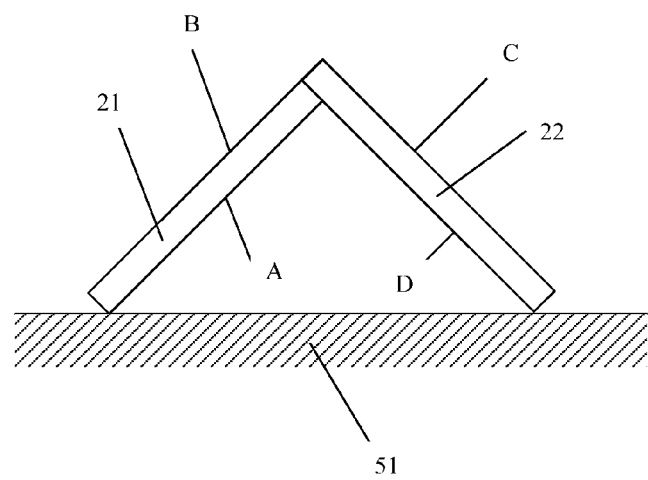
FIG. 8 is a schematic diagram of another use mode of the multi-mode electronic device according to an embodiment of the disclosure.

In the case that surface B is transparent and surface A is non-transparent, a use mode of the multi-mode electronic device may also be a use mode as shown in FIG. 8. FIG. 8 is a schematic diagram of another use mode of the multi-mode electronic device according to the embodiment of the disclosure. The first body 21 and the second body 22 stand in an inverted "V" shape on the placement surface of the table 51. The angle between the first body 21 and the second body 22 is larger than or equal to 180 degree and is smaller than 360 degree in order to facilitate the user to view.

In the case that surface B is transparent, surface A is non-transparent and the angle between the first body 21 and the second body 22 is 360 degree, the multi-mode electronic device is held in a hand and used in a tablet mode.

In the case that both surface A and surface B are transparent, the first body 21 may perform the display both through surface A and the display through surface B. A use mode of the multi-mode electronic device in this case may be the use mode as shown in FIG. 4. The angle between the first body 21 and the second body 22 in this case is larger than or equal to 45 degree and is smaller than or equal to 270 degree in order to facilitate images tp be viewed through both surface A and surface B. An angle between the first body 21 and the second body 22 may be set as desired, which is not limited between 45 degree and 270 degree.

In the case that both surface A and surface B are non-transparent, the multi-mode electronic device is in a sleep mode or a shut down mode. An angle between the first body 21 and the second body 22 may be set as desired.

In the embodiment of the disclosure, the multi-mode electronic device determines the angle resulted from the rotation between the first body and the second body by a first detecting device. In the case that the first detecting device determines that the angle resulted from the rotation between the first body and the second body is larger than a first threshold, (e.g., 90 degree), a first control instruction is generated, where the first control instruction indicates that the multi-mode electronic device is in a laptop mode. In the case that the first detecting device determines that the angle resulted from the rotation between the first body and the second body equals a second threshold (e.g., 0 degree), a second control instruction is generated, where the second control instruction indicates that the multi-mode electronic device is in a tablet mode. In the embodiment of the disclosure, the multi-mode electronic device further includes a second detecting device, for example a gravity sensor, where the second detecting device is configured at least to detect a posture of the first body of the multi-mode electronic device. In the case that the first detecting device determines that the angle resulted from the rotation between the first body and the second body is smaller than the first threshold, (e.g., 90 degree), and larger than a third threshold (e.g., an angle between 1 degree and 30 degree), and a first detecting parameter obtained by the second detecting device indicates that the second body is in a stand state, a third control instruction is generated, where the third control instruction indicates that the multi-mode electronic device is in a stand mode, i.e., in a mode mainly for performing presentation outwards. In the case that the first detecting device determines that the angle resulted from the rotation between the first body and the second body is smaller than the first threshold, (e.g., 90 degree), and larger that the second threshold (e.g., an angle between 1 degree and 30 degree), and a second detecting parameter obtained by the second detecting device indicates that the second body is in an overturned state, a fourth control instruction is generated, where the fourth control instruction indicates that the multi-mode electronic device is in a tent mode.

The electronic device according to the embodiment may be a smart phone.

Figure 9:
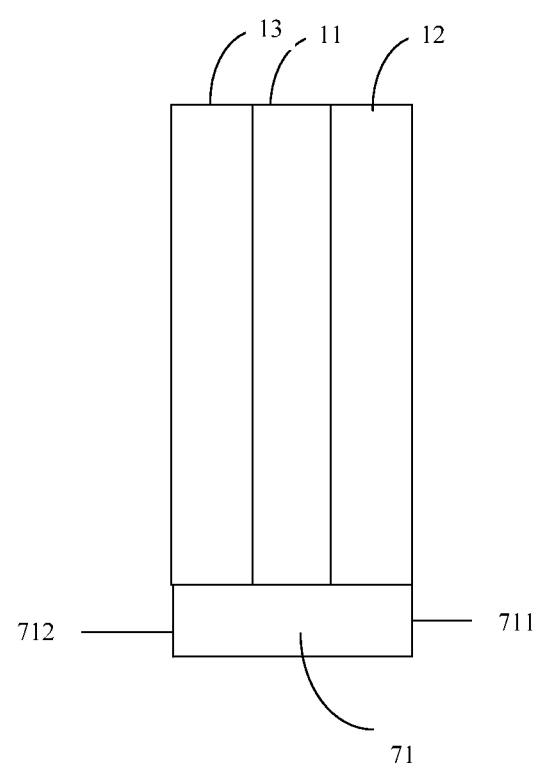
FIG. 9 is a side view of a smart phone according to an embodiment of the disclosure.
Figure 10:
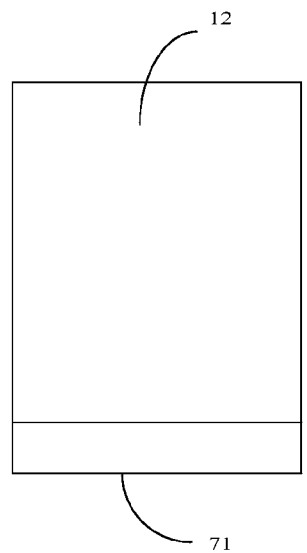
FIG. 10 is a top view of the smart phone shown in FIG. 9.

Referring to FIG. 9 and FIG. 10, FIG. 9 is a side view of a smart phone according to an embodiment of the disclosure, and FIG. 10 is a top view of the smart phone shown in FIG. 9. The smart phone includes a first body and a second body, where the second body includes a non-transparent region arranged at an end of the first body.

The first body includes the transparent display 11, the first adjustable optical panel 12 and the second adjustable optical panel 13 shown in FIG. 2, and the non-transparent region 71 is arranged at an end of the display screen. In this case, the display controller and the adjustable optical panel controller may be arranged in the non-transparent region 71. The adjustable optical panel controller is further configured to control states of the first adjustable optical panel 12 and states of the second adjustable optical panel 13 according to a predetermined operating mode.

The smart phone has a sleep mode and a running mode.

In the case that the smart phone is in the sleep mode, the adjustable optical panel controller controls the first adjustable optical panel 12 to be in the second state, and controls the second adjustable optical panel 13 to be in the second state. In this case the first adjustable optical panel 12 and the second adjustable optical panel 13 are both non-transparent.

In the case that the smart phone is in the running mode, the adjustable optical panel controller controls at least one of the first adjustable optical panel 12 and the second adjustable optical panel 13 to be in the first state.

In the case that the smart phone is in the running mode, the adjustable optical panel controller is configured to: determine one of the first adjustable optical panel 12 and the second adjustable optical panel 13 as a surface being viewed for the user; and control an adjustable optical panel corresponding to the surface being viewed to be in the first state, and control the other adjustable optical panel to be in the second state. In this embodiment, the smart phone may display through the surface facing the user and the other surface is non-transparent, thereby leading to a higher contrast and a better display effect.

A gravity sensor is arranged in the non-transparent region 71, and the adjustable optical panel controller determines the surface being viewed based on a gravity detection signal of the gravity sensor. The smart phone determines a posture of the smart phone being used based on the gravity detection signal of the gravity sensor. And the smart phone determines the surface being viewed based on the current posture of the smart phone.

Optionally, the smart phone includes a first touch sensor and a second touch sensor. The first touch sensor is arranged between the transparent display and the first adjustable optical panel. The adjustable optical panel controller determines the surface being viewed based on touch sense results of the first touch sensor and the second touch sensor. In this case, no matter what state the user is in, the surface being viewed may be determined based on the touch sense results of the first touch sensor and the second touch sensor.

Optionally, a first camera is arranged on the surface 711 of the non-transparent region 71 facing in a same direction with the first surface and a second camera is arranged on the surface 712 of the non-transparent region 71 facing in a same direction with the second surface, and the adjustable optical panel controller determines the surface being viewed based on image capture results of the first camera and the second camera. In this case, no matter what state the user is in, the surface being viewed may be determined based on the image capture results of the first camera and the second camera.

In the case that the smart phone is in the running mode and a preset application is run at the smart phone, the adjustable optical panel controller controls both the first adjustable optical panel 12 and the second adjustable optical panel 13 to be in the first state in which both the first adjustable optical panel 12 and the second adjustable optical panel 13 are transparent. For example, in the case that a photo taking application, a video taking application, or a augmented reality application is run in the smart phone, both the first adjustable optical panel 12 and the second adjustable optical panel 13 are transparent, the user may view a scene of another side the smart phone through the smart phone when the display is performed.

The electronic device according to the embodiment of the disclosure may be a wearable electronic device including a display screen and a wear part. The display screen of the wearable electronic device includes a transparent display and a first adjustable optical panel. In the case that the electronic device includes a second adjustable optical panel, the display screen of the wearable electronic device includes the transparent display, the first adjustable optical panel and the second adjustable optical panel. The wearable electronic device may be smart glasses, a smart bracelet and a smart watch or the like. In the case that the wearable electronic device is smart glasses, the structure of a lens of the smart glasses preferably adopts the structure shown in FIG. 1. Only an adjustable optical panel which is a first adjustable optical panel 12 arranged on an outside surface of the lens that the lens facing away from the wearer when the smart glasses is worn.

Figure 11:
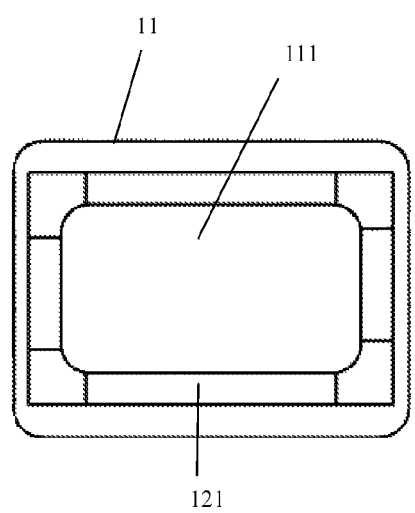
FIG. 11 is a schematic structural diagram of a lens of smart glasses according to an embodiment of the disclosure.

Reference is made to FIG. 11, which is a schematic structural diagram of a lens of smart glasses according to an embodiment of the disclosure. The structure shown in FIG. 1 is employed in the lens. The lens includes a transparent display 11 and a first adjustable optical panel arranged on a first surface of the transparent display 11. The first surface includes a center region 111 and a border region surrounding the center region 111. The first adjustable optical panel is arranged in the border region, and the first adjustable optical panel includes multiple adjustable light units 121. In this case, the adjustable optical panel controller may separately control states of each of the adjustable light units 121. When preset display information is to be highlighted, the preset display information may be display through part of the border region of the first adjustable optical panel, and the adjustable light units 121 corresponding to the part of the border region is in a second state in which the adjustable light units 121 are non-transparent. In this way, it is easy for the wearer to view the display information displayed in the part of the border region.

Figure 12:
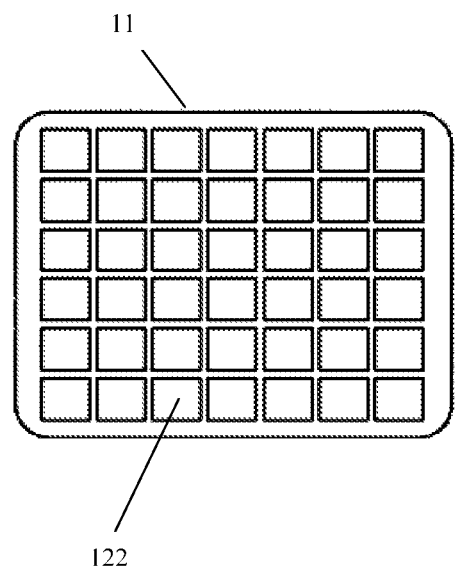
FIG. 12 is a schematic structural diagram of another lens of smart glasses according to an embodiment of the disclosure.

Reference is made to FIG. 12, which is a schematic structural diagram of another lens of smart glasses according to an embodiment of the disclosure. The structure shown in FIG. 1 is employed in the lens, the lens includes a transparent display 11 and a first adjustable optical panel arranged on a first surface of the transparent display 11. The first adjustable optical panel includes multiple adjustable light units 122. In this case, the adjustable optical panel controller may separately control states of each of the adjustable light units 122.

In the embodiment, a structure of the first adjustable optical panel is the same as a structure of the second adjustable optical panel. The first adjustable optical panel includes: a first transparent electrode layer and a second transparent electrode layer arranged oppositely; and a liquid crystal layer arranged between the first transparent electrode layer and the second transparent electrode layer. The adjustable optical panel controller controls the first adjustable optical panel to be in a transparent state or a non-transparent state by controlling an electric field between the first transparent electrode layer and the second transparent electrode layer. The structure of the second adjustable optical panel is the same as the structure of the first adjustable optical panel. The principle for controlling the second adjustable optical panel to be in the transparent state or the non-transparent state is same as the principle for controlling the first adjustable optical panel to be in the transparent state or the non-transparent state.

According to the above description, the electronic device according to the embodiment of the disclosure may adjust a light transmission state of the transparent display. The diverse display modes may facilitate the user to use the electronic device.

Based on the above embodiments of the electronic device, it is also provided a control method for controlling the light transmission state of the above electronic device according to an embodiment of the disclosure.

For the electronic device shown in FIG. 1, the control method includes: controlling the first adjustable optical panel to be in the first state in which the first adjustable optical panel is transparent, in the case that the electronic device is in a first display condition. In this case, the display may be performed through the first surface and be performed through the second surface. And the control method includes: controlling the first adjustable optical panel to be in the second state in which the first adjustable optical panel is non-transparent, in the case that the electronic device is in a second display condition. In this case, the display may only be performed through the second surface. Since the first surface is non-transparent, the contrast and the display effect of the image displayed through the second surface are improved.

For the electronic device shown in FIG. 2, the control method further includes: controlling the second adjustable optical panel to be in a first state in which the second adjustable optical panel is transparent, in the case that the electronic device is in a third display condition; or controlling the second adjustable optical panel to be in a second state in which the second adjustable optical panel is non-transparent, in the case that the electronic device is in a fourth display condition. In this case, the light transmission state and the display mode of the electronic device depend on a combination of the light transmission state of the first adjustable optical panel and the light transmission state of the second adjustable optical panel.

For the above multi-mode electronic device, the control method may further include: controlling the first adjustable optical panel to be in the second state and controlling the second adjustable optical panel to be in the first state based on a first control instruction, in the case that the first control instruction is obtained; the first control instruction indicating that the multi-mode electronic device is in a laptop mode; or controlling the first adjustable optical panel to be in the first state and controlling the second adjustable optical panel to be in the second state based on a second control instruction, in the case that the second control instruction is obtained; the second control instruction indicating that the multi-mode electronic device is in a tablet mode; or controlling the first adjustable optical panel to be in the first state and controlling the second adjustable optical panel to be in the first state based on a third control instruction, in the case that the third control instruction is obtained; the third control instruction indicating that the multi-mode electronic device is in a stand mode; or controlling the first adjustable optical panel to be in the second state and controlling the second adjustable optical panel to be in the second state based on a fourth control instruction, in the case that the fourth control instruction is obtained; the fourth control instruction indicating that the multi-mode electronic device is in a tent mode.

The first control instruction, the second control instruction, the third control instruction and the fourth control instruction may be input through the second body or an external input device of the multi-mode electronic device.

For the above smart phone, the control method may further include: controlling the state of the first adjustable optical panel and the state of the second adjustable optical panel based on a predetermined operating mode.

The control method may further include: controlling the first adjustable optical panel to be in the second state and controlling the second adjustable optical panel to be in the second state, in the case that the smart phone is in a sleep mode; or controlling at least one of the first adjustable optical panel and the second adjustable optical panel to be in the first state in the case that the smart phone is in a running mode.

In the case that the smart phone is in the running mode, the control method further includes: determining one of the first adjustable optical panel and the second adjustable optical panel as a surface being viewed for a user; and controlling an adjustable optical panel corresponding to the surface being viewed to be in the first state and controlling the other adjustable optical panel to be in the second state.

The determining one of the first adjustable optical panel and the second adjustable optical panel as a surface being viewed for a user includes:

determining a surface being viewed based on a gravity detection signal of a gravity sensor arranged in the non-transparent region; or determining a surface being viewed based on touch sense results of a first touch sensor arranged on a surface of the non-transparent region facing in a same direction with the first surface and a second touch sensor arranged on a surface of the non-transparent region facing in a same direction with the second surface, or determining a surface being viewed based on image capture results of a first camera arranged on a surface of the non-transparent region facing in a same direction with the first surface and a second camera arranged on a surface of the non-transparent region facing in a same direction with the second surface.

In the case that the smart phone is in the running mode and a preset application is run at the smart phone, the control method further includes: controlling both the first adjustable optical panel and the second adjustable optical panel to be in the first state. For example, the preset application may be a photo taking application, a video taking application or a augmented reality application.

The control method according to the embodiment of the disclosure may control the light transmission state and the display mode of the electronic device to facilitate the user to use the electronic device.

It should be noted that the embodiments of the electronic device and the embodiments of control method are described with different emphases. Hence, for the same or similar parts between the embodiments, one can refer to the other embodiments.

The description of the embodiments herein enables those skilled in the art to implement or use the present disclosure. Modifications to the embodiments will be obvious to those skilled in the art, and the general principle herein can be implemented in other embodiments without deviation from the essence or scope of the present disclosure. Therefore, the present disclosure will not be limited to the embodiments described herein, but in accordance with the widest scope consistent with the principle and novel features disclosed herein.

The invention claimed is:

1. An electronic device, comprising:
a transparent display,
a display controller, configured to control the transparent display to display content;
a first adjustable optical panel, arranged on a first surface of the transparent display, wherein the first adjustable optical panel is transparent in a first state and the first adjustable optical panel is non-transparent in a second state;
a second adjustable optical panel, arranged on a second surface of the transparent display, wherein the first surface and the second surface are two opposite surfaces of the transparent display, the second adjustable optical panel is transparent in a first state, and the second adjustable optical panel is non-transparent in a second state; and
an adjustable optical panel controller, configured to control the state of the first adjustable optical panel and the state of the second adjustable optical panel; wherein the electronic device is a smart phone comprising a first body and a second body,
wherein the first body comprises the transparent display, the first adjustable optical panel and the second adjustable optical panel, and the second body comprises a non-transparent region arranged at an end of the first body; and
wherein the adjustable optical panel controller is configured to: determine one of the first adjustable optical panel and the second adjustable optical panel as a surface being viewed for a user; and control an adjustable optical panel corresponding to the surface being viewed to be in the first state and control the other adjustable optical panel to be in the second state;

wherein a first camera is arranged on a surface of the non-transparent region facing in a same direction with the first surface and a second camera is arranged on a surface of the non-transparent region facing in a same direction with the second surface, the adjustable optical panel controller determines the surface being viewed based on image capture results of the first camera and the second camera;

a structure of the first adjustable optical panel is the same as a structure of the second adjustable optical panel;

wherein the first adjustable optical panel comprises:
- a first transparent electrode layer and a second transparent electrode layer arranged opposite to the first transparent electrode layer; and
- a liquid crystal layer arranged between the first transparent electrode layer and the second transparent electrode layer;

wherein the adjustable optical panel controller controls the first adjustable optical panel to be in the transparent first state or the non-transparent second state by controlling an electric field between the first transparent electrode layer and the second transparent electrode layer;

wherein the smart phone has a sleep mode and a running mode;
- in the case that the smart phone is in the sleep mode, the adjustable optical panel controller controls the first adjustable optical panel to be in the second state and controls the second adjustable optical panel to be in the second state; or
- in the case that the smart phone is in the running mode, the adjustable optical panel controller controls at least one of the first adjustable optical panel and the second adjustable optical panel to be in the first state; and wherein in the case that the smart phone is in the running mode and a preset application is run at the smart phone, the adjustable optical panel controller controls both the first adjustable optical panel and the second adjustable optical panel to be in the first state.

2. A control method for controlling an electronic device, wherein the electronic device comprises:
- a transparent display,
- a display controller, configured to control the transparent display to display content;
- a first adjustable optical panel, arranged on a first surface of the transparent display, wherein the first adjustable optical panel is transparent in a first state and the first adjustable optical panel is non-transparent in a second state;
- a second adjustable optical panel, arranged on a second surface of the transparent display, wherein the second adjustable optical panel is transparent in a first state and the second adjustable optical panel is non-transparent in a second state; and wherein the control method comprises:
controlling the first adjustable optical panel to be in the first state in which the first adjustable optical panel is transparent, in the case that the electronic device is in a first display condition; or
controlling the first adjustable optical panel to be in the second state in which the first adjustable optical panel is non-transparent, in the case that the electronic device is in a second display condition;
controlling the second adjustable optical panel to be in a first state in which the second adjustable optical panel is transparent, in the case that the electronic device is in a third display condition; or
controlling the second adjustable optical panel to be in a second state in which the second adjustable optical panel is non-transparent, in the case that the electronic device is in a fourth display condition;

wherein the electronic device is a smart phone comprising a first body and a second body, wherein the first body comprises the transparent display, the first adjustable optical panel and the second adjustable optical panel, and the second body comprises a non-transparent region arranged at an end of the first body;

wherein the control method further comprises: determining one of the first adjustable optical panel and the second adjustable optical panel as a surface being viewed for a user; and controlling an adjustable optical panel corresponding to the surface being viewed to be in the first state and controlling the other adjustable optical panel to be in the second state;

wherein the determining one of the first adjustable optical panel and the second adjustable optical panel as a surface being viewed for a user comprises:
determining a surface being viewed based on image capture results of a first camera arranged on a surface of the non-transparent region facing in a same direction with the first surface and a second camera arranged on a surface of the non-transparent region facing in a same direction with the second surface;

wherein a structure of the first adjustable optical panel is the same as a structure of the second adjustable optical panel;

wherein the first adjustable optical panel comprises:
- a first transparent electrode layer and a second transparent electrode layer arranged opposite to the first transparent electrode layer; and
- a liquid crystal layer arranged between the first transparent electrode layer and the second transparent electrode layer;

wherein the adjustable optical panel controller controls the first adjustable optical panel to be in the transparent first state or the non-transparent second state by controlling an electric field between the first transparent electrode layer and the second transparent electrode layer;

wherein the smart phone has a sleep mode and a running mode;
controlling the first adjustable optical panel to be in the second state and controlling the second adjustable optical panel to be in the second state, in the case that the smart phone is in a sleep mode; or
controlling at least one of the first adjustable optical panel and the second adjustable optical panel to be in the first state in the case that the smart phone is in a running mode;

wherein in the case that the smart phone is in the running mode and a preset application is run at the smart phone, the control method further comprises: controlling both the first adjustable optical panel and the second adjustable optical panel to be in the first state.

* * * * *